(12) United States Patent
Morsy et al.

(10) Patent No.: US 12,106,011 B2
(45) Date of Patent: *Oct. 1, 2024

(54) METHOD AND DEVICE FOR AUDIO CROSSFADES USING DECOMPOSED SIGNALS

(71) Applicant: ALGORIDDIM GMBH, Munich (DE)

(72) Inventors: Kariem Morsy, Munich (DE); Federico Tessmann, Munich (DE); Christoph Teschner, Munich (DE)

(73) Assignee: ALGORIDDIM GMBH, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/741,678

(22) Filed: May 11, 2022

(65) Prior Publication Data

US 2022/0269476 A1    Aug. 25, 2022

Related U.S. Application Data

(63) Continuation of application No. 17/343,546, filed on Jun. 9, 2021, now Pat. No. 11,347,475, which is a
(Continued)

(51) Int. Cl.
*G06F 3/16* (2006.01)
*G06F 3/0482* (2013.01)
(Continued)

(52) U.S. Cl.
CPC ............ *G06F 3/165* (2013.01); *G06F 3/0482* (2013.01); *G06N 3/08* (2013.01); *G10H 1/0008* (2013.01);
(Continued)

(58) Field of Classification Search
CPC ............... G06F 3/0482; G06F 3/04847; G06F 3/04883; G06F 3/04886; G06F 3/165;
(Continued)

(56) References Cited

U.S. PATENT DOCUMENTS 5,850,453 A    12/1998    Klayman et al.
6,281,749 B1    8/2001    Klayman et al.
(Continued)

OTHER PUBLICATIONS

U.S. Appl. No. 17/343,546 , "Non-Final Office Action", filed Oct. 8, 2021, 14 pages.
(Continued)

*Primary Examiner* — Gerald Gauthier
(74) *Attorney, Agent, or Firm* — Kilpatrick Townsend & Stockton LLP

(57) ABSTRACT

A device including: first and second input units providing first and second input signals of first and second audio tracks, a decomposition unit to decompose the first input audio signal to obtain decomposed signals, a playback unit to start playback of a first output signal obtained from recombining at least first and second decomposed signals at first and second volume levels, respectively, and a transition unit for performing a transition between playback of the first output signal and playback of a second output signal obtained from the second input signal. The transition unit is adapted for reducing the first/second volume levels according to first/second transition functions. The device includes an analyzing unit to analyze an audio signal to determine a song part junction between two song parts. The transition time interval of at least one of the transition functions is set such as to include the song part junction.

20 Claims, 3 Drawing Sheets

Figure 1:
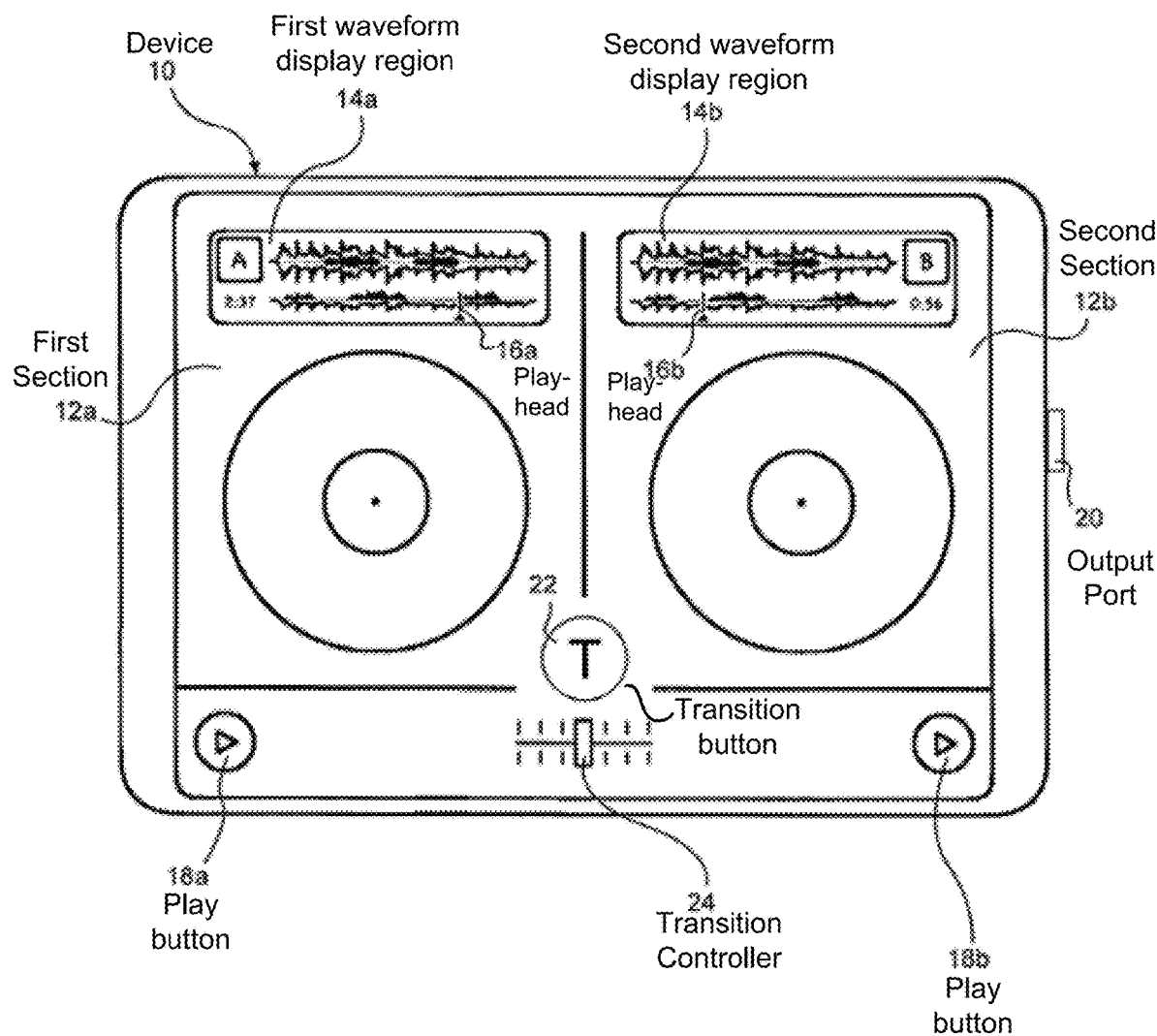

Related U.S. Application Data continuation of application No. PCT/EP2020/065995, filed on Jun. 9, 2020, which is a continuation-in-part of application No. PCT/EP2020/062151, filed on Apr. 30, 2020, and a continuation-in-part of application No. PCT/EP2020/057330, filed on Mar. 17, 2020, and a continuation-in-part of application No. PCT/EP2020/056124, filed on Mar. 6, 2020.

(51) Int. Cl.

| | |
|---|---|
| *G06N 3/08* | (2023.01) |
| *G10H 1/00* | (2006.01) |
| *G10L 21/028* | (2013.01) |
| *G10L 21/034* | (2013.01) |
| *G10L 21/043* | (2013.01) |
| *G10L 25/30* | (2013.01) |
| *G10L 25/51* | (2013.01) |
| *G11B 20/10* | (2006.01) |
| *G11B 27/10* | (2006.01) |
| *H04N 21/439* | (2011.01) |
| *H04R 3/12* | (2006.01) |
| *H04S 1/00* | (2006.01) |
| *H04B 1/16* | (2006.01) |

(52) U.S. Cl.
CPC .......... *G10L 21/028* (2013.01); *G10L 21/034* (2013.01); *G10L 21/043* (2013.01); *G10L 25/30* (2013.01); *G10L 25/51* (2013.01); *G11B 20/10527* (2013.01); *G11B 27/105* (2013.01); *H04N 21/439* (2013.01); *H04R 3/12* (2013.01); *H04S 1/007* (2013.01); *G10H 2210/056* (2013.01); *G10H 2210/076* (2013.01); *G10H 2210/081* (2013.01); *G10H 2210/125* (2013.01); *G10H 2210/325* (2013.01); *G10H 2210/391* (2013.01); *G10H 2220/101* (2013.01); *G10H 2240/325* (2013.01); *G10H 2250/311* (2013.01); *H04B 1/1646* (2013.01); *H04R 2227/003* (2013.01); *H04R 2227/005* (2013.01); *H04S 2400/13* (2013.01)

(58) Field of Classification Search
CPC ........ G06F 3/167; G06F 16/219; G06F 16/40; G06F 16/635; G06F 16/639; G06F 3/16; G06F 18/217; G06F 18/285; G06N 3/045; G06N 3/0464; G06N 3/08; G10H 1/008; G10H 1/0041; G10H 1/0058; G10H 1/08; G10H 1/36; G10H 1/40; G10H 1/46; G10H 2210/056; G10H 2210/076; G10H 2210/081; G10H 2210/125; G10H 2210/155; G10H 2210/241; G10H 2210/325; G10H 2210/391; G10H 2220/101; G10H 2220/106; G10H 2230/015; G10H 2240/325; G10H 2250/035; G10H 2250/311; G10H 2250/641; G10H 1/0008; G10H 1/0025; G10H 1/0091; G10H 1/18; G10H 1/348; G10H 1/48; G10H 2220/155; G10H 2220/241; G10L 21/0272; G10L 21/028; G10L 21/0316; G10L 21/034; G10L 21/043; G10L 25/30; G10L 25/51; G11B 20/10; G11B 20/10527; G11B 27/034; G11B 27/038; G11B 27/105; G11B 27/28; G11B 27/30; G11B 27/322; H04B 1/1646; H04H 60/04; H04N 21/439; H04R 3/00; H04R 3/12; H04R 5/04; H04R 27/00; H04R 29/008; H04R 2227/003; H04R 2227/005; H04R 2420/01; H04R 2430/01; H04R 1/10; H04S 1/007; H04S 2400/13; H04S 2400/15; H04S 2420/07; H04S 7/302; H04S 7/304; B60H 1/0025; H03G 3/20; H04M 19/047

USPC .......... 84/625, 645; 381/1; 700/94; 704/205
See application file for complete search history.

(56) References Cited

U.S. PATENT DOCUMENTS

| | | | |
|---|---|---|---|
| 6,714,652 B1 | 3/2004 | Davis et al. | |
| 7,031,474 B1 | 4/2006 | Yuen et al. | |
| 7,319,764 B1 | 1/2008 | Reid et al. | |
| 7,945,054 B2 | 5/2011 | Kim | |
| 8,069,036 B2* | 11/2011 | Pauws | G11B 27/034 |
| | | | 381/1 |
| 8,619,998 B2 | 12/2013 | Walsh et al. | |
| 8,854,447 B2 | 10/2014 | Conness et al. | |
| 9,286,383 B1* | 3/2016 | Robinson | G06F 3/04847 |
| 9,343,054 B1* | 5/2016 | McGilliard | G06F 16/639 |
| 9,424,348 B1* | 8/2016 | Riggs-Zeigen | G06F 3/167 |
| 9,620,169 B1* | 4/2017 | Nolan | G11B 27/038 |
| 10,062,367 B1 | 8/2018 | Evans et al. | |
| 10,101,960 B2* | 10/2018 | Jehan | G06F 16/40 |
| 10,114,607 B1* | 10/2018 | Riggs-Zeigen | G06F 3/165 |
| 10,319,410 B1* | 6/2019 | Townsend | G11B 27/30 |
| 10,887,033 B1 | 1/2021 | Tessmann et al. | |
| 10,998,992 B2 | 5/2021 | Kron | |
| 11,347,475 B2* | 5/2022 | Morsy | G10L 21/0316 |
| 2006/0083381 A1 | 4/2006 | Magrath | |
| 2008/0013757 A1 | 1/2008 | Carrier | |
| 2008/0190271 A1* | 8/2008 | Taub | G10H 1/0058 |
| | | | 84/645 |
| 2008/0221895 A1 | 9/2008 | Pauws et al. | |
| 2008/0249644 A1* | 10/2008 | Jehan | G11B 27/322 |
| 2009/0019995 A1* | 1/2009 | Miyajima | G11B 27/034 |
| | | | 84/625 |
| 2009/0157203 A1* | 6/2009 | Bregar | G11B 20/10527 |
| | | | 700/94 |
| 2010/0027799 A1 | 2/2010 | Romesburg et al. | |
| 2010/0165815 A1* | 7/2010 | Wilson | G11B 27/105 |
| 2011/0093101 A1* | 4/2011 | Casagrande | G11B 27/28 |
| | | | 705/26.1 |
| 2012/0053710 A1* | 3/2012 | Lindahl | G11B 20/10 |
| | | | 704/500 |
| 2012/0210230 A1 | 8/2012 | Matsuda et al. | |
| 2014/0254831 A1* | 9/2014 | Patton | H03G 3/20 |
| | | | 381/107 |
| 2014/0358265 A1* | 12/2014 | Wang | G10H 1/40 |
| | | | 700/94 |
| 2015/0018993 A1* | 1/2015 | Trivedi | G11B 27/28 |
| | | | 700/94 |
| 2015/0319518 A1* | 11/2015 | Wilson | H04R 1/10 |
| | | | 381/74 |
| 2017/0358181 A1* | 12/2017 | Moussette | H04M 19/047 |
| 2018/0088896 A1* | 3/2018 | Olson | G06F 3/165 |
| 2018/0122403 A1 | 5/2018 | Koretzky et al. | |
| 2018/0192108 A1* | 7/2018 | Lyons | G06F 16/219 |
| 2018/0247625 A1* | 8/2018 | Shi | G10H 1/40 |
| 2018/0277076 A1* | 9/2018 | Vilermo | G10H 1/46 |
| 2018/0315452 A1* | 11/2018 | Shi | G10H 1/0041 |
| 2019/0066643 A1* | 2/2019 | Packouz | B60H 1/0025 |
| 2019/0246204 A1 | 8/2019 | Bohrarper et al. | |
| 2019/0246234 A1* | 8/2019 | Sherburne | H04S 7/304 |
| 2019/0251398 A1* | 8/2019 | Godwin, IV | G06F 18/217 |
| 2019/0251402 A1* | 8/2019 | Godwin, IV | G06F 18/285 |
| 2019/0272144 A1* | 9/2019 | Kotelly | H04R 27/00 |
| 2019/0341010 A1* | 11/2019 | Wipperfürth | G10H 1/0008 |
| 2020/0043453 A1 | 2/2020 | Lang et al. | |
| 2020/0043517 A1 | 2/2020 | Jansson | |
| 2020/0089465 A1* | 3/2020 | Wöhst | G06F 3/165 |
| 2020/0097248 A1* | 3/2020 | Wood | H04S 7/302 |
| 2020/0235972 A1 | 7/2020 | Li | |
| 2020/0402489 A1* | 12/2020 | Sakata | G06F 16/635 |

(56) References Cited

U.S. PATENT DOCUMENTS

| | | |
|---|---|---|
| 2020/0410968 A1 | 12/2020 | Mahdavi et al. |
| 2021/0050029 A1 | 2/2021 | Kleinberger et al. |
| 2021/0201863 A1* | 7/2021 | Bosch Vicente ......... G10H 1/36 |
| 2021/0279030 A1 | 9/2021 | Morsy et al. |
| 2021/0287646 A1* | 9/2021 | Packouz .................. G10H 1/18 |
| 2021/0294567 A1* | 9/2021 | Morsy ...................... H04R 3/12 |
| 2021/0342669 A1* | 11/2021 | Godwin, IV ........... G06N 3/045 |
| 2021/0390938 A1* | 12/2021 | Morsy .................. G06F 3/0482 |
| 2022/0269476 A1* | 8/2022 | Morsy ..................... G10L 25/30 |
| 2023/0343189 A1* | 10/2023 | Moussette ........... H04M 19/047 |
| 2023/0343315 A1* | 10/2023 | Packouz ................ G10H 1/348 |
| 2024/0078987 A1* | 3/2024 | Fraga ....................... G10H 1/46 |

OTHER PUBLICATIONS

U.S. Appl. No. 17/343,546, "Notice of Allowance", filed Feb. 2, 2022, 10 pages.

International Application No. PCT/EP2020/065995, "International Search Report and Written Opinion", Jan. 19, 2021, 22 pages.

Roma et al., "Remixing Musical Audio on the Web Using Source Separation", Proceedings of the 2nd AES Workshop on Intelligent Music Production, Apr. 4-6, 2016, pp. 1-4.

* cited by examiner

METHOD AND DEVICE FOR AUDIO CROSSFADES USING DECOMPOSED SIGNALS

CROSS REFERENCE TO RELATED APPLICATIONS

This application is a continuation of U.S. patent application Ser. No. 17/343,546 entitled "Transition Functions Of Decomposed Signals", filed Jun. 9, 2021, which is a continuation of PCT/EP2020/065995, filed on Jun. 9, 2020, which application claims the benefit of PCT/EP2020/062151, filed on Apr. 30, 2020, PCT/EP2020/057330, filed on Mar. 17, 2020, and PCT/EP2020/056124, filed on Mar. 6, 2020. The full disclosures of each of the above-referenced priority applications are incorporated herein by this reference in their entirety.

DESCRIPTION

The present invention relates to methods and devices for processing audio signals, in particular a first input signal of a first input audio track and a second input signal of a second input audio track, which allow playback of a transition from the first input audio track to the second input audio track.

Methods and devices of this type are used in all fields of sound reproduction or audio playback, for example in DJ equipment, mixers, music players etc. Input audio tracks may in particular be songs or other pieces of music which are to be played through a PA system, speakers or headphones.

It is a general desire to play transitions between different audio tracks in such a manner as to sound smooth and continuous, thus avoiding any abrupt changes of the sound, any breaks or gaps of silence, any abrupt shifts in tempo or in the general atmosphere of the sound. Therefore, several approaches are known to cross-fade audio tracks such that over a certain transition time interval (usually some seconds) both tracks are played, wherein the volume of the first track is reduced while the volume of the second track is increased. In order to further improve the smoothness of the transition, it is further known to perform a tempo matching and/or a key matching of the two tracks, hence avoiding a sudden change in the beat or tune during the transition.

However, playing smooth transitions between two audio tracks remains difficult, in particular for tracks containing vocal components which, due to their nature and sound structure, cannot easily be mixed without inducing dissonances or timing problems at least at some point in time during the transition. As a result, for example DJs try to run a transition from one audio track to another audio track at such parts of the songs where one of the two tracks has a break/pause in its vocal component, for example during an instrumental solo part or at a song part junction between two parts of a song (e.g. between verse and chorus or the like). This, however, requires a considerable amount of experience of the DJ and cannot always reliably be achieved for all types of music.

It was therefore an object of the present invention to provide methods and devices of the above-mentioned type which allow playing smooth transitions between a first audio track and a second audio track at different desired positions within the audio tracks, and which are easier to operate for a user.

According to a first aspect of the present invention, this object is achieved by a method for processing audio signals, comprising the steps of providing a first input signal of a first input audio track and a second input signal of a second input audio track, decomposing the first input signal to obtain a plurality of decomposed signals, comprising at least a first decomposed signal and a second decomposed signal different from the first decomposed signal, assigning a first volume level to the first decomposed signal and a second volume level to the second decomposed signal, starting playback of a first output signal obtained from recombining at least the first decomposed signal at the first volume level with the second decomposed signal at the second volume level, such that the first output signal substantially equals the first input signal, while playing the first output signal, reducing the first volume level according to a time-dependent first transition function and reducing the second volume level according to a time-dependent second transition function different from said first transition function, starting playback of a second output signal obtained from the second input signal after starting playback of the first output signal but before volume levels of all decomposed signals of the first input signal have reached substantially zero.

In the present disclosure, audio tracks, in particular a first input audio track and a second input audio track, may include digital audio data such as contained in audio files or digital audio streams. The files or streams may have a specific length or playback duration or alternatively may have an undefined or infinitive length or playback duration, such as for example in case of a live stream or a continuous data stream received from a content provider via Internet. Note that digital audio tracks are usually stored in an audio file in association with consecutive time frames, the length of each time frame being dependent on the sampling rate of the audio data as conventionally known. For example, in an audio file sampled at a sampling rate of 44.1 kHz one time frame will have a length of 0.023 ms. Furthermore, audio tracks may be embodied by analog audio signals, for example signals played by an analog playback device such as a vinyl player, a tape player etc. In specific embodiments, audio tracks may be songs or other pieces of music provided in digital or analog format.

Furthermore, the term "audio signal" refers to an audio track or any part or portion of an audio track at a certain position or time within the audio track. The audio signal may be a digital signal processed, stored or transmitted through an electronic control system, in particular computer hardware, or may be an analog signal processed, stored or transmitted by analog audio hardware such as an analog mixer, a PA system or the like.

Methods according to the first aspect of the invention use a step of decomposing at least the first input audio signal to obtain a plurality of different decomposed signals. Several decomposing algorithms and services are known in the art, which allow decomposing audio signals to separate therefrom one or more signal components of different timbres, such as vocal components, drum components or instrumental components. Such decomposed signals and decomposed tracks have been used in the past to create certain artificial effects such as removing vocals from a song to create a karaoke version of a song.

More specifically, with regard to decomposing audio data there have been several approaches based on artificial intelligence and deep neural networks in order to decompose mixed audio signals to separate therefrom signals of certain timbres. Some AI systems usually implement a convolutional neural network (CNN), which has been trained by a plurality of data sets for example including a vocal track, a harmonic/instrumental track and a mix of the vocal track and the harmonic/instrumental track. Examples for such conventional AI systems capable of separating source tracks such as a singing voice track from a mixed audio signal include: Pretet, "Singing Voice Separation: A study on training data", Acoustics, Speech and Signal Processing (ICASSP), 2019, pages 506-510; "spleeter"—an open-source tool provided by the music streaming company Deezer based on the teaching of Pretet above, "PhonicMind" (https://phonicmind.com)—a voice and source separator based on deep neural networks, "Open-Unmix"—a music source separator based on deep neural networks in the frequency domain, or "Demucs" by Facebook AI Research—a music source separator based on deep neural networks in the waveform domain. These tools accept music files in standard formats (for example MP3, WAV, AIFF) and decompose the song to provide decomposed/separated tracks of the song, for example a vocal track, a bass track, a drum track, an accompaniment track or any mixture thereof.

According to an important aspect of the present invention, volume changes of decomposed tracks based on different transition functions are used to realize a smooth transition between playback of a first audio track and playback of a second audio track. In particular, at a point in time before the transition, the decomposed signals of the first input signal are recombined or mixed to obtain a first output signal in such a manner that the first output signal substantially equals the first input signal. Normally, this means that the volume levels of all decomposed tracks are set to the same value, in particular to 100% (full volume). Furthermore, the set of decomposed signals obtained in the step of decomposing the first input signal is preferably a complete set, which means that they sum up to an output signal substantially equal to the original input signal. For example, if the input signal consists of a vocal component, a drum component and an instrumental component and substantially no other components, a complete set of decomposed signals obtained in the step of decomposing then includes a decomposed vocal signal, a decomposed drum signal and a decomposed instrumental signal, such that, when recombined, they sum up to an output signal substantially equal to the original first input signal. "Substantially equal" in this respect means that at this point in time of the process, a difference between the first output signal and the first input signal is not audible or at least not disturbing to a user.

Starting from a condition as stated above in which the first output signal is played such as to be substantially equal to the first input signal, according to the present invention, a transition towards playback of the second input track (more precisely audio signals obtained from the second input track) is commenced by reducing the volume levels of the decomposed signals of the first input signal and increasing the volume levels of audio data obtained from the second input signal. The volume levels of decomposed tracks are each changed according to a respective transition function associated to each of the decomposed signals. At least the first transition function associated with the first decomposed signal is different from the second transition function associated with the second decomposed signal such that in a transition time interval the volume change of the first decomposed signal will be different from that of the second decomposed signal.

This allows reducing the proportion of certain sound components, which tend to create mixing problems when mixed with respective sound components of the second input track during the transition. For example, vocal components may be reduced in volume or even muted during a transition in order to avoid clashing of the vocals of two different songs, while at the same time other sound components, such as a drum component, which more easily mix with corresponding components of the second song can be maintained at a higher volume level in order to achieve an acoustic continuity throughout the transition.

As a result, the method according to the first aspect of the invention allows reducing abrupt changes of the sound or disharmony/dissonances induced by mixing certain sound components of two different audio tracks, while at the same time mixing other sound components which are more suitable to be played together, such as to achieve a smooth and continuous transition between two audio tracks.

In a preferred embodiment of the present invention, a method of the first aspect may further comprise the steps of
decomposing the second input signal to obtain a plurality of decomposed signals comprising at least a third decomposed signal and a fourth decomposed signal different from the third decomposed signal,
assigning a third volume level to the third decomposed signal and a fourth volume level to the fourth decomposed signal,
starting playback of the second output signal obtained from recombining at least the third decomposed signal and the fourth decomposed signal,
while playing the second output signal, increasing the third volume level according to a time-dependent third transition function and increasing the fourth volume level according to a time-dependent fourth transition function different from said third transition function, until the second output signal substantially equals the second input signal.

In this way, not only the fading out of the first input signal but also the fading in of the second input signal can be controlled on the basis of specific sound components or timbres such as to make the transition even smoother and continuous. For example, the volume of a decomposed drum signal may be increased more quickly as it has a lower tendency to clash with the decomposed drum signal of the first input signal, whereas the decomposed vocal signal of the second input signal may be faded in at a later point in time or by using a transition function beginning with a lower slope in order to avoid clashing with the decomposed vocal signal of the first input signal.

Each of the transition functions preferably assigns a predetermined volume level or a predetermined change in volume level to each of a plurality of time frames within a transition time interval defined by a transition start time and transition end time or to each of a plurality of controller positions of a user control element. Transition functions may be embodied in digital format by a formula stored in a memory of an electronic device such that for each time or control position an associated volume level or a change in volume level can be calculated using the formula.

As an alternative to storing a formula of the transition function, a lookup table or pre-stored array can be used which stores predetermined values of volume levels or changes in volume level such that a volume level or change in volume level can be derived for each time frame or controller position by looking up the table or array. As a further alternative, transition functions may be represented by analog means such as a controllable resistor.

Preferably, at least two of the transition functions, more preferably all of the first to fourth transition functions, are based on time frames and have the same transition time interval reaching from the same transition start time to the same transition end time such that the transition can be carried out within a predetermined time interval using more than one transition function for more than one decomposed signal.

The first transition function and the second transition function are preferably defined such that the volume level is at a maximum at the transition start time and at a minimum at the transition end time, such that the first output signal is continuously faded out and can finally be stopped completely when the transition to the second output signal is completed. A minimum volume level herein preferably refers to a 0% volume level or substantial silence. Note that in the present disclosure a 0% volume level or substantial silence includes playback of an audio signal at a volume level below an auditory threshold such that it cannot be heard any more by a user during playback, and it further includes a complete stop of the playback of an audio signal.

Likewise, the third transition function and the fourth transition function may be defined such that the volume level is at a minimum, in particular corresponding to substantial silence, at a transition start time and at a maximum at a transition end time in order to allow continuous fade-in of the second output signal from silence to maximum.

According to embodiments of the present invention, the shapes of the transition functions can be set in order to achieve certain effects for certain decomposed signals and for controlling the transition. In particular, at least one of the transition functions may be a linear function or contain a linear portion. Linear fade-ins or fade-outs are relatively easy to realize technically and correspond to sound developments the user is used to hear in conventional mixes, for example at the end of songs.

At least one of the transition functions may be a continuous function, such that unexpected sudden changes of the volume level can be avoided. In addition or alternatively, at least one of the transition functions may be a monotonic function such that the volume level does not change its direction with regard to increasing or decreasing throughout the transition time interval or throughout the controller range. In this way, the user gets an impression of a seamless, continuous transition from the first output signal towards the second output signal.

As mentioned above, improved transitions between audio tracks can be achieved according to the present invention by using different volume changes for different sound components of the tracks, i.e. different transition functions for different decomposed signals of the tracks. In one embodiment, the first transition function and the second transition function may differ from each other with regard to slope. Likewise, the third transition function and the fourth transition function may differ from each other with regard to slope. This means that for example the decomposed vocal signal of the first input signal may be faded out more quickly in order to give way for the decomposed vocal signal of the second input signal, whereas the decomposed drum signal of the first input signal remains in the mix more prominently for a longer time and mixes with the decomposed drum signal of the second input track over a considerable portion of the transition time interval or controller range.

In general, all types of decomposing algorithms can be used for decomposing the first and/or second input signal. Different algorithms, for example algorithms as known in the art and mentioned above, achieve different results with respect to quality of the decomposition and speed of processing. Preferably, in embodiments of the present invention the step of decomposing includes processing the first audio signal and/or the second audio signal within an AI system comprising a trained neural network. AI systems achieve a high level of quality and in particular allow decomposing different timbres of a mixed audio signal, which in particular may correspond or resemble certain source tracks that were originally mixed when producing or generating the input audio track, such as certain instrumental tracks, vocal tracks, drum tracks etc. More particular, the step of decomposing may include decomposing the first/second audio signal with regard to predetermined timbres such as to obtain decomposed signals of different timbres, preferably being selected from the group consisting of a vocal timbre, a non-vocal timbre, a drum timbre, a non-drum timbre, a harmonic timbre, a non-harmonic timbre, and any combination thereof. The non-vocal timbre, the non-drum timbre and the non-harmonic timbre may in particular be respective complement signals to that of the vocal timbre, the drum timbre and the harmonic timbre. Complement signals may be obtained by excising from the input signal one decomposed signal of a specific timbre. For example, an input signal may be decomposed or separated into two decomposed signals, a decomposed vocal signal of a vocal timbre, and its complement, a decomposed non-vocal signal of a non-vocal timbre, which means that a mixture of the decomposed vocal signal and the decomposed non-vocal signal results in a signal substantially equal to the input signal.

Alternatively, decomposition can be carried out to obtain a decomposed vocal track and a plurality of decomposed non-vocal tracks such as a decomposed drum track and a decomposed harmonic track (including harmonic instruments such as guitars, piano, synthesizer).

In a preferred embodiment of the present invention, the first decomposed signal and the third decomposed signal are different signals of a vocal timbre, wherein the second decomposed signal and the fourth decomposed signal are different signals of a non-vocal timbre, and/or at least at a transition reference time or a controller reference position a sum of the first transition function and the third transition function is smaller than a sum of the second transition function and the fourth transition function. In this manner, the sum of the decomposed vocal signals is smaller during the transition, in particular at least at a transition reference time or a controller reference position, than a sum of the decomposed non-vocal signals. This reduces the mixture of the vocals of the different input signals (avoiding clashing of vocals of different songs), while keeping continuity of the playback during the transition because of the higher volume of the decomposed non-vocal signals of both input signals.

In a further embodiment of the present invention, the first decomposed signal and the third decomposed signal are different signals of a drum timbre, wherein the second decomposed signal and the fourth decomposed signal are different signals of a non-drum timbre, and/or at least at a transition reference time or at a controller reference position (for example a controller center position), a sum of the first transition function and the third transition function is larger than a sum of the second transition function and the fourth transition function. With this feature, a mixture of the decomposed drum signals of both input signals is achieved with relatively high volume level throughout the transition time interval or throughout the controller range, such that the drum beat continuously moves on throughout the transition time interval or throughout the controller range to ensure a feeling of continuity and to avoid any undesired breaks of the rhythm.

In a further preferred embodiment of the present invention, the first decomposed signal and the third decomposed signal are different signals of a non-drum timbre, a vocal timbre or a harmonic timbre, and/or a sum of the first transition function and the third transition function has a minimum, preferably substantially zero volume level, between the transition start time (T1) and the transition end time (T3) or between the controller end positions. In this way, decomposed signals which have a tendency to induce disharmony or dissonances when mixed together are controlled in such a manner that at the time they have about the same volume level, i.e. somewhere in the middle region of the transition time interval or the controller range, for example at a transition reference time or a controller reference position (for example a controller center position), their overall volume level (the sum of both volume levels) is minimal, such that the contribution of the possibly problematic mixture of the two decomposed signals is reduced to a minimum and the mixture of the remaining decomposed signals which mix more easily will dominate the sound at this point in time.

In a further embodiment of the present invention, the method further includes a step of analyzing an audio signal, preferably at least one of the decomposed signals, to determine a song part junction between two song parts within the first input audio track or within the second input audio track, wherein a transition time interval of at least one of the transition functions is set such as to include the song part junction. Song parts of a song are usually distinguishable by an analyzing algorithm since they differ in several characteristics such as instrumental density, medium pitch or rhythmic pattern. Song parts may in particular be a verse, a chorus, a bridge, an intro or an outro as conventionally known. Certain instrumental or rhythmic patterns will remain constant within a song part and will change in the next song part.

Recognition of song parts may be supported by analyzing not only the entire input signal but instead or in addition thereto at least one of the decomposed signals. For example, by analyzing a decomposed bass signal in isolation from the remaining sound components, it will be easy to derive therefrom a chord progression of the song which is one of the key criteria to differentiate song parts. Furthermore, an analysis of the decomposed drum signals allows a more accurate recognition of a rhythmic pattern and thus a more accurate detection of certain song parts. A song part junction then refers to a junction between one song part and the next song part.

According to the embodiment described above, transition time intervals may include song part junctions which allow to carry out the transition between two songs at the end of the song part which further improves smoothness and likeability of the transition.

Song parts may be detected by analyzing at least one of the decomposed signals within an AI system comprising a trained neural network. Preferably, such analyzing includes detecting silence within the decomposed signal, said silence preferably representing an audio signal having a volume level smaller than −30 dB. In particular, the step of analyzing decomposed signals may include detecting silence continuously extending over a predetermined time span within the decomposed signal, said silence preferably representing an audio signal having a volume level smaller than −30 dB. Thus, in embodiments of the invention start- and/or end points of silence may be taken as song part junctions.

In a further embodiment of the present invention, the method further includes the steps of receiving a user input referring to a transition command, including at least one transition parameter, and setting at least one of the transition functions according to the transition parameter. This allows a user to control when and/or how the transition is played. For example, the transition parameter may be a transition start time or a transition end time of a transition time interval of at least one of the transition functions, or may be a length of a transition time interval of at least one of the transition functions. This allows a user to control when the transition is to be carried out and how long it takes. A user may also control at which position in the song a transition is to be performed by choosing only one transition parameter such as a transition reference time of at least one of the transition functions. In this case, either the location of the transition start time relative to the transition reference time and the length of the transition time interval, or the location of both, the transition start time and the transition end time, should be preset values. Furthermore, the transition parameter may refer to a slope, shape or offset of at least one of the transition functions which allows a user to control the dynamics of the transition for one of or more decomposed signals.

As a further alternative or additional option, a transition parameter to be controlled by a user input may refer to an assignment or de-assignment of a preset transition function to or from a selected one of the plurality of decomposed signals. In this way, a user may select one or more decomposed signals to take part in the transition which are then submitted to the volume changes according to the respective transition functions. The transition function assigned to a certain decomposed signal may be selected from one of a set of preset transition functions (sets of different transition time interval lengths or sets of different transition functions having different slope, shape or offset).

In a further embodiment of the present invention, the method may comprise the steps of
 determining at least one tempo parameter of the first and/or second input track, in particular a BPM (beats per minute) and/or a beat grid and/or a beat phase of the first and/or second input track and
 a tempo matching processing based on the determined tempo parameter, including a time stretching and/or time shifting and/or resampling of audio data obtained from the first input track and/or the second input track, such that the first output signal and the second output signal have mutually matching BPM and/or mutually matching beat phases.

As a result, first and second output signals will have matching tempi thus enhancing continuity of the playback during the transition.

In a further embodiment of the present invention, the method may further comprise the steps of
 determining a key of the first and/or second input track and
 a key matching processing based on the determined key, including a pitch shifting of audio data obtained from the first input track and/or the second input track, such that the first output signal and the second output signal have mutually matching keys.

Thus, an unexpected pitch shift or change in key during transition can be avoided which enhances continuity and smoothness of the transition.

In general, the method of the present invention can be applied to any type of input audio track. For example, the input audio track may be stored on a local device such as a storing means of a computer, and may be present as a digital audio file. Furthermore, the first input audio track or the second input audio track may be received as a continuous stream, for example a data stream received via Internet, a real-time audio stream received from a live audio source or from a playback device in playback mode. Thus, the range of applications is basically not limited to a specific medium. When receiving the first/second input audio track as a continuous stream, playback of the first output signal and/or second output signal may be started while continuing to receive the continuous stream. This has particular advantages in many situations where the audio tracks do not have a certain length or playback duration as the length is either unlimited or undefined, for example in case of processing signals from a live concert or live broadcasting. Furthermore, it is not necessary to wait until a certain audio file is completely downloaded or received or until a certain audio track has completely been played by the playback device, but instead playback of the output signals based on the received input signals can be started earlier.

In another preferred embodiment of the present invention, decomposing first and/or second input signal is carried out segment-wise, wherein decomposing is carried out based on a first segment of the input signal such as to obtain a first segment of the decomposed signal, and wherein decomposing of a second segment of the input signal is carried out while playing the first segment of the decomposed signal. Partitioning the first and/or second input signals into segments (preferably segments of equal lengths) and operating the method of the invention based on these segments allows using the decomposition result for playing the transition at an earlier point in time, i.e. after finishing decomposition of just one segment, without having to wait until the decomposition result of an entire audio file for example is available. Another advantage of the segmentation is that decomposition of the second input signal can start at an arbitrary point within the second input audio track. For example, when an optimal transition start point for the second input audio file is determined to be at e.g. 01:20 (one minute, twenty seconds), that decomposition can start at the segment closest to 01:20, and the beginning part which is not used does not have to be decomposed. This saves performance and ensures that decomposition results are available much faster. Preferably one segment has a playback duration which smaller than 20 seconds.

The method steps, in particular the steps of providing the first and second input signals, decomposing the first input signal, starting playback of the first output signal and starting playback of the second output signal, may be carried out in a continuous process, wherein a time shift between receiving the first input audio track or a first portion of a continuous stream of the first input audio track and starting playback of the first output signal is preferably less than 10 seconds, more preferably less than 2 seconds, and/or wherein a time shift between receiving the second input audio track or a first portion of a continuous stream of the second input audio track and starting playback of the second output signal is preferably less than 10 second, more preferably less than 2 seconds.

In a further embodiment of the present invention, at least one, preferably all of the first and second input signals, the decomposed signals and the first and second output signals represent stereo signals, each comprising a left channel signal portion and a right channel signal portion, respectively. The method is thus suitable for playing music at high quality.

According to a second aspect of the present invention, the above-mentioned object is solved by a device for processing audio signals, comprising:

a first input unit providing a first input signal of a first input audio track and a second input unit providing a second input signal of a second input audio track, a decomposition unit configured to decompose the first input audio signal to obtain a plurality of decomposed signals, comprising at least a first decomposed signal and a second decomposed signal different from the first decomposed signal, a playback unit configured to start playback of a first output signal obtained from recombining at least the first decomposed signal at a first volume level with the second decomposed signal at a second volume level, such that the first output signal substantially equals the first input signal, a transition unit for performing a transition between playback of the first output signal and playback of a second output signal obtained from the second input signal, wherein the transition unit has a volume control section adapted for reducing the first volume level according to a first transition function and reducing the second volume level according to a second transition function different from said first transition function.

Such a device includes several units carrying out method steps as described above for the first aspect of the present invention. Furthermore, in embodiments of the device of the second aspect of the invention, further units or other device features may be implemented which are configured to carry out methods or method features of any of the above-described embodiments of the first aspect of the present invention. Reference is thus made to the description above of the first aspect of the present invention, as the device of the second aspect of the present invention can achieve the corresponding technical effects and advantages.

A device of the second aspect of the present invention is preferably embodied as a computer running a suitable software application. In particular, the software application may be configured to carry out a method according to the first aspect of the present invention. The computer may be a personal computer, a tablet computer or a smartphone, and may include in the manner as conventionally known a RAM, a ROM, a microprocessor and suitable input/output means. Included in the computer or connected to the computer may be an audio interface which may be connected, for example wireless (e.g. via Bluetooth or similar technology), to speakers, headphones or a PA system in order to output sound when playing the first and second output signals, respectively. As a further alternative, the device may be embodied as a standalone DJ device including suitable electronic hardware or computing means.

If the device uses an AI system for decomposing audio data, the device preferably has a decomposition unit which includes the AI system comprising a trained neural network. This means that the complete AI system including the trained neural network may be integrated within the device, for example as a software application or software plugin running locally in a memory integrated within the device. Furthermore, the device preferably includes a user interface embodied by either a display such as a touch display or a display to be operated by a pointer device, or as one or more hardware control elements such as a hardware fader or rotatable hardware knobs, or by a voice command or by any other user input/output technology.

Figure 2:
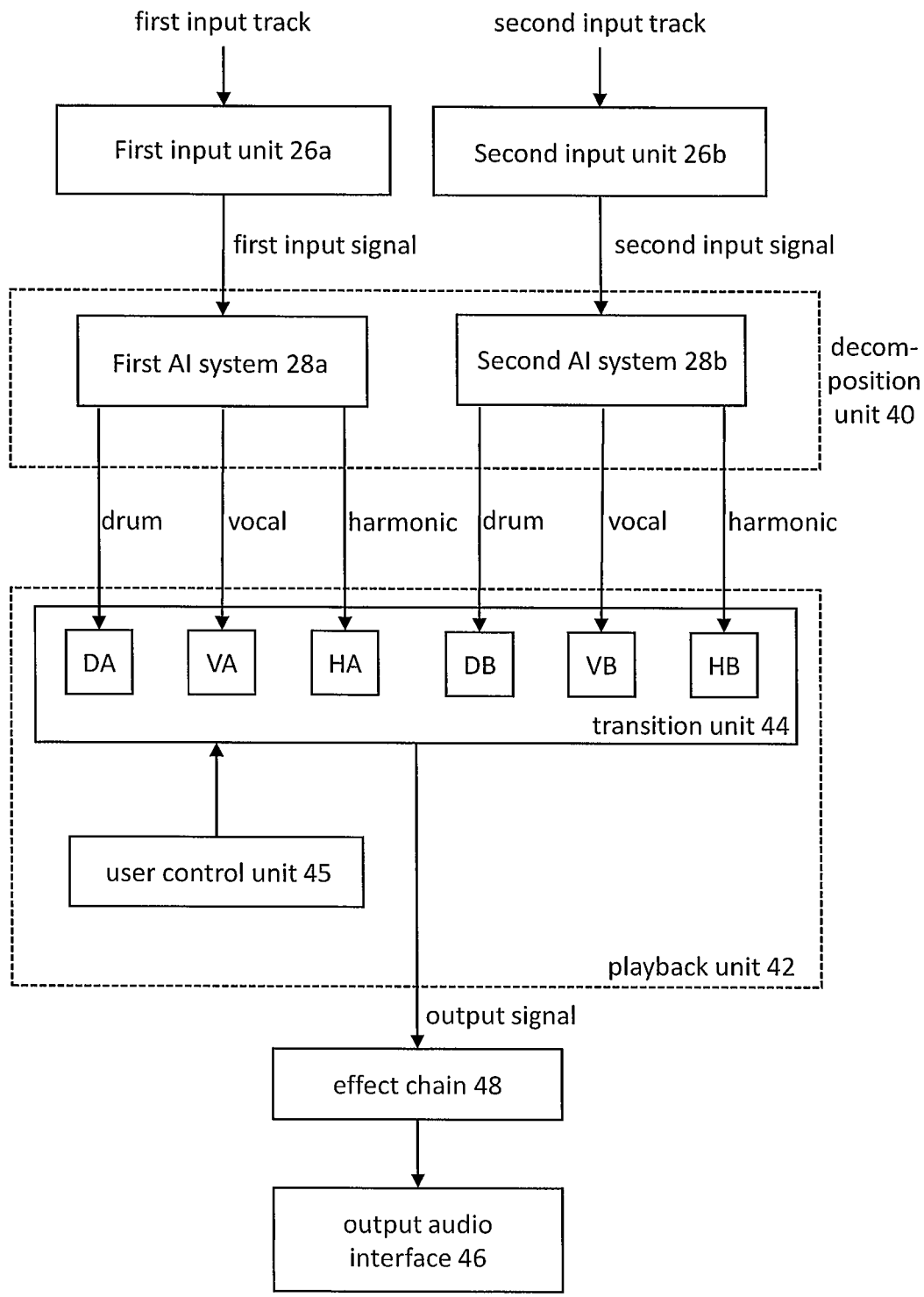

Preferred embodiments of the present invention will be described in the following on the basis of the attached drawings, wherein FIG. 1 shows a device according to an embodiment of the present invention, FIG. 2 shows a schematic functional diagram of components of the device of the embodiment shown in FIG. 1, and FIGS. 3a-3c show transition functions for decomposed tracks as used in the device of the embodiment of the invention as shown in FIGS. 1 and 2 and according to a method of an embodiment of the invention.

A device 10 according to an embodiment of the present invention may be formed by a computer such as a tablet computer or a smartphone, which comprises standard hardware components such as input/output ports, wireless connectivity, a housing, a touchscreen, an internal storage as well as a plurality of microprocessors, RAM and ROM. Essential features of the present invention are implemented in device 10 by means of a suitable software application or a software plugin running on device 10.

The display of device 10 preferably has a first section 12a associated to a first song A and a second section 12b associated to a second song B. First section 12a includes a first waveform display region 14a which displays at least one graphical representation of song A, in particular one or more waveform signals associated to song A. For example, the first waveform display region 14a may display a waveform of song A and/or one or more waveforms of decomposed signals obtained from decomposing song A. For example, decomposition of song A may be carried out to obtain a decomposed drum signal, a decomposed vocal signal and a decomposed harmonic signal, which may be displayed within the first waveform display region 14a. Likewise, a second waveform display region 14b may be included in the second section 12b such as to display a graphical representation related to song B in the same or corresponding manner as described above for song A. Thus, the second waveform display region 14b may display one or more waveforms of song B and/or at least one waveform of a decomposed signal obtained from song B.

Furthermore, first and second waveform display regions 14a, 14b may each display a play-head 16a, 16b, respectively, which show a current playback position within song A and song B, respectively.

Each of the first and second sections 12a and 12b may further include a number of control elements for controlling playback, effects and other features related to song A and song B, respectively. For example, the first section 12a may include a play button 18a which can be pushed by a user to alternatively start and stop playback of song A (more precisely audio signals obtained from Song A, such as decomposed signals). Likewise, the second section 12b may include a play button 18b which may be pushed by a user to alternatively start and stop playback of song B (more precisely audio signals obtained from Song B, such as decomposed signals).

An output signal generated by device 10 in accordance with the settings of device 10 and with a control input received from a user may be output at an output port 20 in digital or analog format, such as to be transmitted to a further audio processing unit or directly to a PA system, speakers or head phones. Alternatively, the output signal may be output through internal speakers of device 10.

According to the present invention, device 10 can perform a smooth transition from playback of song A to playback of song B by virtue of a transition unit, which will be explained in more detail below. In the present embodiment, device 10 may comprise a transition button 22 displayed on the display of device 10, which may be pushed by a user to initiate a transition from playback of song A towards playback of song B. By a single operation of transition button 22 (pushing the button 22), device 10 starts changing individual volumes of individual decomposed signals of songs A and B according to respective transition functions such as to smoothly crossfade from song A to song B within a predetermined transition time interval.

In addition or alternatively, device 10 may include a transition controller 24 which can be moved by a user between one controller end point referring to a playback of only song A and a second controller end point referring to playback of only song B. This allows controlling the volumes of individual decomposed signals of songs A and B using transition functions, which are based not on time but on controller position of the transition controller 24. In this manner, in particular the speed and progress of the transition can manually be controlled through the transition controller 24.

FIG. 2 shows a schematic illustration of internal components of device 10 and a signal flow within device 10.

Audio processing is based on a first input track and a second input track, which may be stored within the device 10, for example in an internal memory of the device, a hard drive or any other storage medium. First and second input tracks are preferably digital audio files of a standard compressed or uncompressed audio file format such as mp3, WAV, AIFF or the like. Alternatively, first and second input tracks may be received as continuous streams, for example via an Internet connection of device 10 or from an external playback device via an input audio interface or via a microphone.

First and second input tracks are preferably processed within first and second input units 26a and 26b, respectively, which may be configured to decrypt or decompress the audio data, if necessary, and/or may be configured to extract a segment of the first input track and a segment of the second input track in order to continue processing based on the segments. This has an advantage that time-consuming processing algorithms, such as the decomposition based on a neural network, will not have to analyze the entire first or second input track upfront, but will perform processing based on shorter segments, which allows continuing processing and eventually start playback at an earlier point in time. In addition, in case of receiving the first and second input tracks as continuous streams, it would in many cases not be feasible to wait until the complete input tracks are received before starting to process the data.

The output of the first and second input units 26a, 26b, for example the segments of the first and second input tracks, form first and second input signals, and they are input into first and second AI systems 28a, 28b of a decomposition unit 40. Each AI system 28a, 28b includes a neural network trained to decompose the first and second input signals, respectively, with respect to sound components of different timbres. Decomposition unit 40 thus decomposes the first input signal to obtain a first group of decomposed signals and decomposes the second input signal to obtain a second group of decomposed signals. In the present example, each group of decomposed signals includes a decomposed drum signal, a decomposed vocal signal and a decomposed harmonic signal, which each form a complete set of decomposed signals or a complete decomposition, which means that a sum of all decomposed signals of the first group will resemble the first input signal, and the sum of all decomposed signals of the second group will resemble the second input signal.

It should be noted that although in the present embodiment two AI systems 28a, 28b are used, decomposition unit 40 may also include only one AI system and only one neural network, which is trained and configured to determine all decomposed signals of the first input signal as well as all decomposed signals of the second input signal. As a further alternative, more than two AI systems may be used, for example a separate AI system and a separate neural network may be used to generate each of the decomposed signals.

All decomposed signals, in particular both groups of decomposed signals, are then input into a playback unit 42 in order to generate an output signal for playback. Playback unit 42 comprises a transition unit 44, which is basically adapted to recombine the decomposed signals of both groups taking into account specific volume levels associated to each of the decomposed signals. Transition unit 44 is configured to recombine the decomposed signals in such a manner as to either play only a first output signal obtained from a sum of all decomposed signals of the first input signal, or a second output signal obtained from a sum of all decomposed signals of the second input signal, or any transition in between the first and the second output signals where decomposed signals of both first and second input signals are played. In particular, transition unit 44 stores individual transition functions DA, VA, HA, DB, VB, HB for each of the decomposed signals which each define a specific volume level for each time frame within a transition interval or for each controller position of the transfer controller within a controller range. Taking into account the respective volume levels according to the respective transition functions DA, VA, HA, DB, VB, HB, all decomposed signals will then be recombined to obtain the output signal.

Playback unit 42 may further include a control unit 45, which is adapted to control at least one or the transition functions DA, VA, HA, DB, VB, HB based on a user input.

The output signal generated by playback unit 42 may then be routed to an output audio interface 46 for a sound output. At any location within the signal flow, one or more sound effects may be inserted into the audio signal by means of one or more effect chains 48. In the present example, effect chain 48 is located between playback unit 42 and output audio interface 46.

Figure 3A:
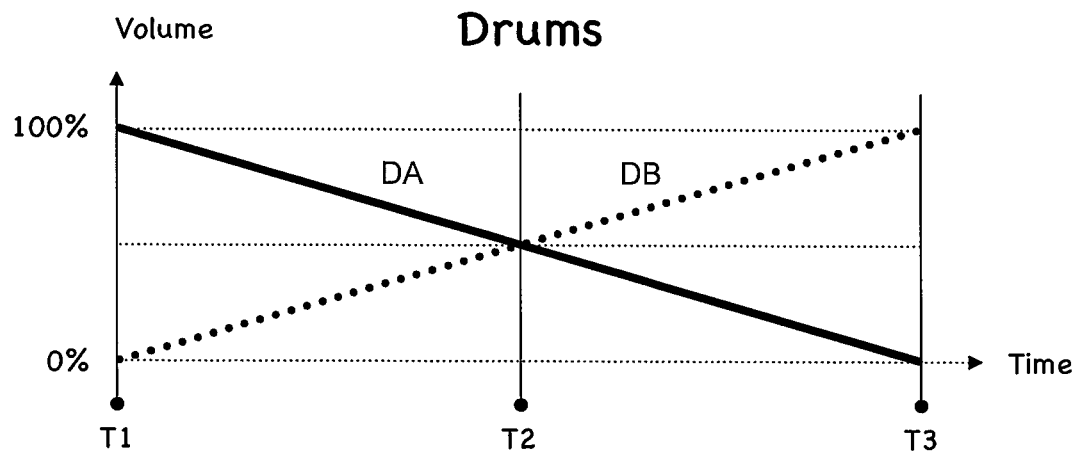
Figure 3B:
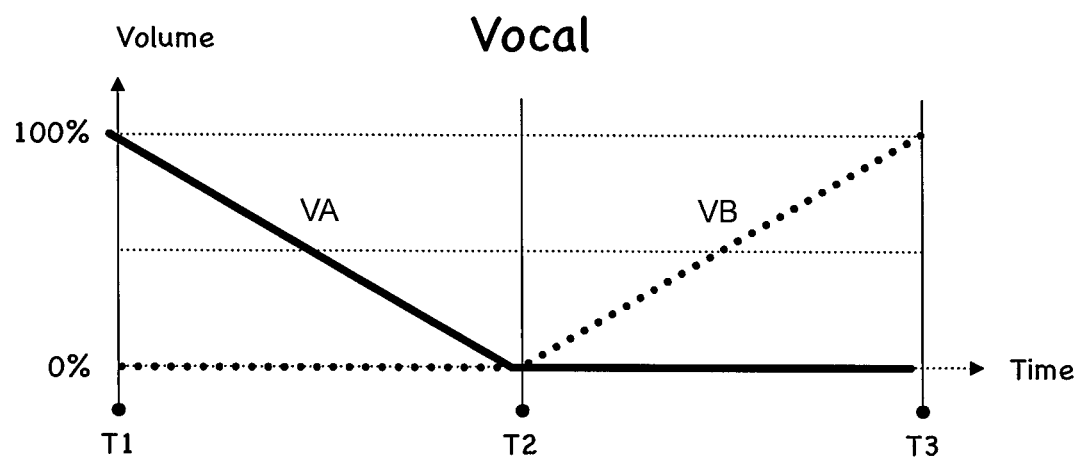
Figure 3C:
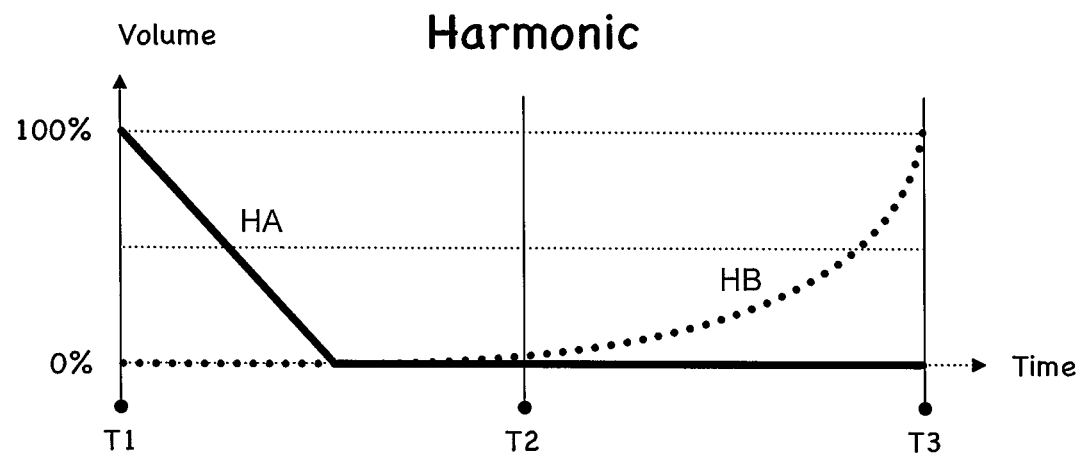

FIGS. 3a to 3c show examples of transition functions that may be used in transition unit 44 to set specific volume levels of individual decomposed signals depending on time. The example transition functions are based on time (time dependent transition functions), thus the transition is performed within a transition time interval reaching from a transition start time T1 to a transition end time T3. At an intermediate point in time, for example in the center of the transition time interval, a time T2 is referred to as a transition reference time.

As shown in FIG. 3a, a transition function DA of the decomposed drum signal of song A starts at 100% at T1 and decreases linearly to 0% at T3, while the transition function DB of the decomposed drum signal of song B starts at 0% at T1 and increases linearly to reach 100% at T3. The linear transition functions DA and DB intersect at T2. It can be seen that a sum of DA+DB equals 100% throughout the transition time interval from T1 to T3. Thus, the overall volume level of all drums remains constant during the transition as well as before and after the transition such as to achieve a high level of audible continuity.

FIG. 3b shows transition functions of decomposed vocal signals of songs A and B. In the present embodiment, the transition function VA of the decomposed vocal signal of song A starts at 100% at T1 and decreases linearly to reach 0% in a middle region of the transition time interval, for example at the transition reference time T2. Afterwards, the transition function VA remains constant at 0% until T3, i.e. in the interval between T2 and T3. On the other hand, the transition function VB of the decomposed vocal signal of song B starts at 0% at T1 and remains constant at 0% until a middle region of the transition time interval, in particular until T2, and afterwards increases linearly to reach 100% at T3. As can be seen in FIG. 3b, a sum of the transition functions VA+VB reaches the minimum in the middle region of the transition time interval, in particular at T2, and specifically becomes 0%. In other words, the volume level of the decomposed vocal signal of song B starts rising only after the volume level of the decomposed vocal signal of song A has dropped to 0%. In this way, any clashing of the vocals of songs A and B can be avoided.

As can be seen in FIG. 3c, transition functions of decomposed harmonic signals (for example instrumental components) are again different from the transition functions of the decomposed vocal signals and the decomposed drum signals, respectively. In a specific example, the transition function HA of the decomposed harmonic signal of song A starts at 100% at T1 and reduces in a linear manner, but with a steeper slope as compared to the transition function VA of the decomposed vocal signal of song A, such as to reach 0% at a time before transition function VA reaches 0%, specifically before T2. After reaching 0%, transition function HA remains constant at 0% until T3. Furthermore, transition function HB of the decomposed harmonic signal of song B rises continuously and monotonically from 0% at T1 to 100% at T3, but not in a linear manner but in a curved manner, for example a parabolic or exponentially curved manner. Thus, a slope of transition function HB is increasing from T1 to T3.

As can be seen in FIG. 3c, a mixture of the decomposed harmonic signals of songs A and B is again avoided or substantially reduced, because the substantial increase of the volume level of the decomposed harmonic signal of song B starts only after the volume level of the decomposed harmonic signal of song A has reached 0%.

It should be noted that although the transition functions shown in FIGS. 3a to 3c are defined in relation to time within a transition time interval from T1 to T3, corresponding or other transition functions may likewise be defined with respect to the controller position of the transition controller 24 shown in FIG. 1. In particular, instead of reaching from T1 to T3, the horizontal axis of the transition functions may show the controller position reaching over the controller range from left end position to right end position.

With reference again to FIG. 1, it should be noted that a user may initiate a transition according to the transition functions shown in FIGS. 3a to 3c for example by pushing the transition button 22. In particular, T1 may be set to the time at which the user pushes the transition button 22. Alternatively, the transition may be controlled by a user by an appropriate marking or selection within one of the first and second waveform display regions 14a, 14b or any other user input. For example by clicking on a certain position in one of the waveforms displayed on one of the waveform display regions 14a, 14b, timing of a next transition can be set accordingly, for example any of the time points T1, T2 or T3 may be set at the specified position within the waveform corresponding to a certain future time point. Thus, when the playback reaches the specified point in time, the transition will be carried out using the respective transition functions for the respective decomposed signals. As a further alternative, device 10 may have stored a setting, for example a pre-stored setting or a setting that can be manipulated by a user, wherein the setting defines at least one condition for carrying out a transition from song A to song B or vice versa. For example, the setting may specify that at a certain point in time with respect to an end of one of songs A or B, a transition to the respective other song is commenced. For example, a transition from song A to song B may be started at a certain time period (for example 5 seconds) before the end of song A, such as to avoid any interruption of the playback when song A ends.

In a further embodiment, device 10 may include means for determining characteristic song parts of songs A and/or B, such as a verse, a chorus, a bridge, an intro or an outro. A user may then choose to carry out a transition at a junction between two song parts, or device 10 may automatically carry out a transition at certain song part junctions and towards certain song part junctions of the other song, for example a transition from the beginning of an outro section of song A to an end of an intro section of song B.

The invention claimed is:

1. A method for processing audio signals, comprising:
providing a first input signal of a first input audio track and a second input signal of a second input audio track;
decomposing the first input signal to obtain a plurality of decomposed signals, comprising at least a first decomposed signal and a second decomposed signal different from the first decomposed signal;
assigning a first volume level to the first decomposed signal and a second volume level to the second decomposed signal;
starting playback of a first output signal obtained from recombining at least the first decomposed signal at the first volume level with the second decomposed signal at the second volume level, such that the first output signal substantially equals the first input signal;
while playing the first output signal, reducing the first volume level according to a first transition function and reducing the second volume level according to a second transition function different from said first transition function, wherein each of the transition functions assigns a predetermined volume level or a predetermined change in volume level to each of a plurality of controller positions within a controller range of a user operated controller defined between a controller first end position and a controller second end position; and
starting playback of a second output signal obtained from the second input signal after starting playback of the first output signal but before volume levels of all decomposed signals of the first input signal have reached substantially zero.

2. The method of claim 1, wherein the first transition function and the second transition function are defined such that the volume level is at a maximum at the controller first end position, and such that the volume level is at a minimum at the controller second end position.

3. The method of claim 1, wherein at least one of the transition functions is a linear function or contains a linear portion.

4. The method of claim 1, wherein at least one of the transition functions is one or more of a continuous function or a monotonic function.

5. The method of claim 1, further comprising the steps of:
decomposing the second input signal to obtain a plurality of decomposed signals comprising at least a third decomposed signal and a fourth decomposed signal different from the third decomposed signal;
assigning a third volume level to the third decomposed signal and a fourth volume level to the fourth decomposed signal;
starting playback of the second output signal obtained from recombining at least the third decomposed signal and the fourth decomposed signal; and
while playing the second output signal, increasing the third volume level according to a third transition function and increasing the fourth volume level according to a fourth transition function different from said third transition function, until the second output signal substantially equals the second input signal.

6. The method of claim 5, wherein the third transition function and the fourth transition function are defined such that the volume level is at a minimum at the controller first end position, and such that the volume level is at the controller second end position.

7. A device for processing audio signals, comprising:
a first input unit providing a first input signal of a first input audio track and a second input unit providing a second input signal of a second input audio track;
a decomposition unit configured to decompose the first input audio signal to obtain a plurality of decomposed signals, comprising at least a first decomposed signal and a second decomposed signal different from the first decomposed signal;
a playback unit configured to start playback of a first output signal obtained from recombining at least the first decomposed signal at a first volume level with the second decomposed signal at a second volume level, such that the first output signal substantially equals the first input signal;
a transition unit for performing a transition between playback of the first output signal and playback of a second output signal obtained from the second input signal, wherein the transition unit has a volume control section adapted for reducing the first volume level according to a first transition function and reducing the second volume level according to a second transition function different from said first transition function;
wherein each of the first and second transition functions assigns a predetermined volume level or a predetermined change in volume level to each of a plurality of controller positions within a controller range of a user operated controller defined between a controller first end position and a controller second end position; and
wherein the transition unit is configured to start playback of a second output signal obtained from the second input signal after starting playback of the first output signal but before volume levels of all decomposed signals of the first input signal have reached substantially zero.

8. The device of claim 7, wherein the decomposition unit is configured to decompose the second input signal to obtain a plurality of decomposed signals comprising at least a third decomposed signal and a fourth decomposed signal different from the third decomposed signal;
wherein the second output signal is obtained from recombining at least the third decomposed signal at a third volume level and the fourth decomposed signal at a fourth volume level; and
wherein the volume control section is adapted for increasing the third volume level according to a third transition function and increasing the fourth volume level according to a fourth transition function different from said third transition function, until the second output signal substantially equals the second input signal.

9. The device of claim 7, wherein the first transition function and the second transition function are defined such that the volume level is at a maximum at the controller first end position, and at a minimum at the controller second end position.

10. The device of claim 8, wherein the third transition function and the fourth transition function are defined such that the volume level is at a minimum at the controller first end position, and at a maximum at the controller second end position.

11. The device of claim 7, wherein at least one of the transition functions is a linear function or contains a linear portion.

12. The device of claim 8, wherein at least one of the transition functions is a continuous function and/or a monotonic function.

13. The device of claim 8, wherein the first transition function and the second transition function differ from each other with regard to slope.

14. A method for processing audio signals, comprising:
providing a first input signal of a first input audio track and a second input signal of a second input audio track;
decomposing the first input signal to obtain a plurality of decomposed signals, comprising at least a first decomposed signal and a second decomposed signal different from the first decomposed signal;
assigning a first volume level to the first decomposed signal and a second volume level to the second decomposed signal;
starting playback of a first output signal obtained from recombining at least the first decomposed signal at the first volume level with the second decomposed signal at the second volume level, such that the first output signal substantially equals the first input signal;
while playing the first output signal, reducing the first volume level according to a first transition function and reducing the second volume level according to a second transition function different from said first transition function, wherein each of the transition functions assigns a predetermined volume level or a predetermined change in volume level to each of a plurality of controller positions within a controller range of a user operated controller defined between a controller first end position and a controller second end position;
starting playback of a second output signal obtained from the second input signal after starting playback of the first output signal but before volume levels of all decomposed signals of the first input signal have reached substantially zero; and
wherein the first transition function and the second transition function differ from each other with regard to slope.

15. A method for processing audio signals, comprising:
providing a first input signal of a first input audio track and a second input signal of a second input audio track;
decomposing the first input signal to obtain a plurality of decomposed signals, comprising at least a first decomposed signal and a second decomposed signal different from the first decomposed signal;
assigning a first volume level to the first decomposed signal and a second volume level to the second decomposed signal;
starting playback of a first output signal obtained from recombining at least the first decomposed signal at the first volume level with the second decomposed signal at the second volume level, such that the first output signal substantially equals the first input signal;
while playing the first output signal, reducing the first volume level according to a first transition function and reducing the second volume level according to a second transition function different from said first transition function, wherein each of the transition functions assigns a predetermined volume level or a predetermined change in volume level to each of a plurality of controller positions within a controller range of a user operated controller defined between a controller first end position and a controller second end position;
starting playback of a second output signal obtained from the second input signal after starting playback of the first output signal but before volume levels of all decomposed signals of the first input signal have reached substantially zero; and
analyzing an audio signal comprising at least one of the decomposed signals to determine a song part junction between two song parts within the first input audio track or within the second input audio track, wherein a transition time interval of at least one of the transition functions is set such as to include the song part junction.

16. A method for processing audio signals, comprising:
providing a first input signal of a first input audio track and a second input signal of a second input audio track;
decomposing the first input signal to obtain a plurality of decomposed signals, comprising at least a first decomposed signal and a second decomposed signal different from the first decomposed signal;
assigning a first volume level to the first decomposed signal and a second volume level to the second decomposed signal;
starting playback of a first output signal obtained from recombining at least the first decomposed signal at the first volume level with the second decomposed signal at the second volume level, such that the first output signal substantially equals the first input signal;
while playing the first output signal, reducing the first volume level according to a first transition function and reducing the second volume level according to a second transition function different from said first transition function, wherein each of the transition functions assigns a predetermined volume level or a predetermined change in volume level to each of a plurality of controller positions within a controller range of a user operated controller defined between a controller first end position and a controller second end position;
starting playback of a second output signal obtained from the second input signal after starting playback of the first output signal but before volume levels of all decomposed signals of the first input signal have reached substantially zero;
receiving a user input referring to a transition command, including at least one transition parameter; and
setting at least one of the transition functions according to the transition parameter.

17. The method of claim 16, wherein the transition parameter is a slope, shape or offset of at least one of the transition functions.

18. The method of claim 16, wherein the transition parameter is an assignment or deassignment of a preset transition function to or from a selected one of the plurality of decomposed signals.

19. A device for processing audio signals, comprising:
a first input unit providing a first input signal of a first input audio track and a second input unit providing a second input signal of a second input audio track;
a decomposition unit configured to decompose the first input audio signal to obtain a plurality of decomposed signals, comprising at least a first decomposed signal and a second decomposed signal different from the first decomposed signal;

a playback unit configured to start playback of a first output signal obtained from recombining at least the first decomposed signal at a first volume level with the second decomposed signal at a second volume level, such that the first output signal substantially equals the first input signal;

a transition unit for performing a transition between playback of the first output signal and playback of a second output signal obtained from the second input signal, wherein the transition unit has a volume control section adapted for reducing the first volume level according to a first transition function and reducing the second volume level according to a second transition function different from said first transition function;

an analyzing unit configured to analyze an audio signal to determine a song part junction between two song parts within the first input audio track or within the second input audio track, wherein a transition time interval of at least one of the transition functions is set such as to include the song part junction;

a user interface configured to accept a user input referring to a transition command, including at least one transition parameter, wherein the transition unit is configured to set at least one of the transition functions according to the transition parameter; and wherein the transition parameter is preferably selected from one or more of:
 a transition start time (T1) of a transition time interval of at least one of the transition functions,
 a transition end time (T3) of a transition time interval of at least one of the transition functions,
 a length of a transition time interval of at least one of the transition functions,
 a transition reference time (T2) within the transition time interval of at least one of the transition functions,
 a slope, shape or offset of at least one of the transition functions, or
 an assignment or deassignment of a preset transition function to or from a selected one of the plurality of decomposed tracks.

20. A device for processing audio signals, comprising:
a first input unit providing a first input signal of a first input audio track and a second input unit providing a second input signal of a second input audio track;

a decomposition unit configured to decompose the first input audio signal to obtain a plurality of decomposed signals, comprising at least a first decomposed signal and a second decomposed signal different from the first decomposed signal;

a playback unit configured to start playback of a first output signal obtained from recombining at least the first decomposed signal at a first volume level with the second decomposed signal at a second volume level, such that the first output signal substantially equals the first input signal;

a transition unit for performing a transition between playback of the first output signal and playback of a second output signal obtained from the second input signal, wherein the transition unit has a volume control section adapted for reducing the first volume level according to a first transition function and reducing the second volume level according to a second transition function different from said first transition function;

an analyzing unit configured to analyze an audio signal to determine a song part junction between two song parts within the first input audio track or within the second input audio track, wherein a transition time interval of at least one of the transition functions is set such as to include the song part junction; and wherein the device includes a display unit configured to display a graphical representation of at least one of the decomposed signals, wherein a user interface is configured to allow a user to assign or deassign a preset transition function to or from a selected one of the plurality of decomposed tracks.

* * * * *